United States Patent
Welton

(10) Patent No.: US 6,206,476 B1
(45) Date of Patent: Mar. 27, 2001

(54) WASTE CONCRETE CONTAINER

(75) Inventor: Richard J. Welton, Garland, TX (US)

(73) Assignee: TXI Operations, LP, Dallas, TX (US)

(*) Notice: Subject to any disclaimer, the term of this patent is extended or adjusted under 35 U.S.C. 154(b) by 0 days.

(21) Appl. No.: 09/246,403

(22) Filed: Feb. 8, 1999

(51) Int. Cl.[7] ....................................................... B60P 1/00
(52) U.S. Cl. ...................... 298/1 B; 298/22 R; 298/22 P
(58) Field of Search ................................. 298/1 B, 22 R, 298/22 P; 296/184

(56) References Cited

U.S. PATENT DOCUMENTS

| 1,627,336 |   | 5/1927  | Nelson . |
|-----------|---|---------|----------|
| 1,808,251 | * | 6/1931  | Osman ................................. 298/1 B |
| 1,989,125 |   | 1/1935  | Atwell . |
| 3,626,489 | * | 12/1971 | Pioch ................................. 298/1 B X |
| 4,106,812 | * | 8/1978  | Clark ................................... 298/1 B |
| 4,382,632 | * | 5/1983  | Pitts ................................. 298/22 P X |
| 4,934,898 |   | 6/1990  | Galbreath . |
| 5,002,340 | * | 3/1991  | Loggins ........................... 298/1 B X |
| 5,090,773 |   | 2/1992  | Guillaume . |
| 5,460,431 |   | 10/1995 | McWilliams . |
| 5,601,393 |   | 2/1997  | Waldschmitt . |

* cited by examiner

*Primary Examiner*—Stephen T. Gordon
(74) *Attorney, Agent, or Firm*—William D. Jackson; Locke Liddell & Sapp LLP

(57) ABSTRACT

A waste container for the disposition of waste concrete comprising a bottom floor section having a major dimension extending longitudinally of the container, front and rear lateral dimensions which are substantially less than the major longitudinal dimension, and a forward end closed by a forward transverse wall section. Opposed side walls extend longitudinally of the container and upwardly from the bottom floor section to define with the bottom floor section a receptacle for waste concrete. The side walls are flared from the front to the back of the container to provide a back opening which has a lateral dimension greater than the lateral dimension of the forward transverse wall section. The side walls are sufficiently flexible to permit relative displacement between a first lateral dimension corresponding to the configuration of the side walls when they are not stressed and a second lateral dimension which is less than the first lateral dimension. A reconfiguration system is connected to at least one of the side walls and effective to compress the lateral dimension of the side walls relative to one another from a first somewhat greater lateral dimension to the second reduced lateral dimension when a plastic mass, such as unset concrete or the like, is added to the container.

15 Claims, 3 Drawing Sheets

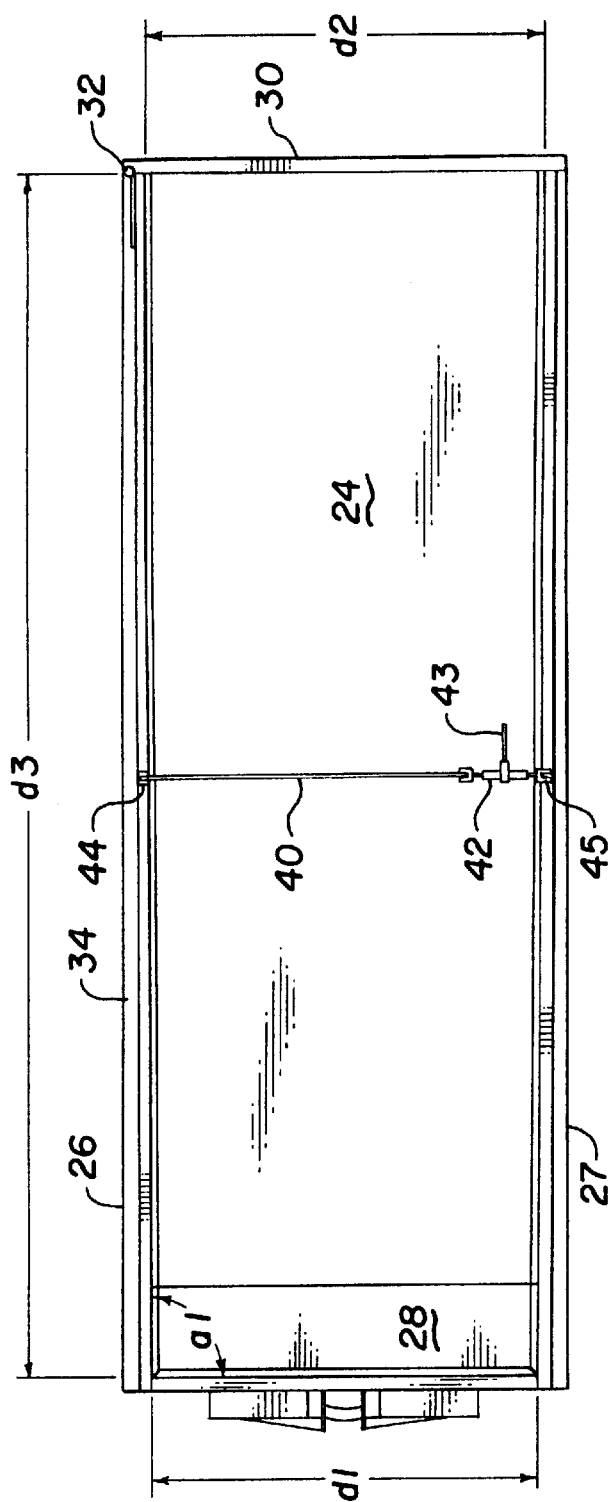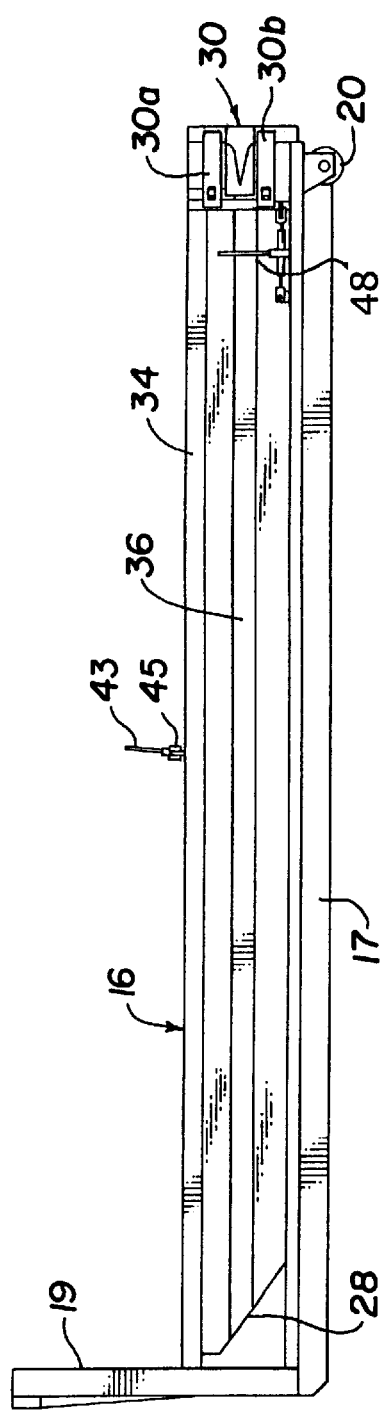

WASTE CONCRETE CONTAINER

BACKGROUND OF THE INVENTION

In the construction industry it is a common practice in pouring large quantities of concrete to use concrete trucks ranging in capacity from 10 cubic yards to about 12 cubic yards to transport the plastic hydraulic concrete mix from a batching plant to the construction site. The timing and dispatching of concrete trucks is very important since the age of the concrete in the truck is significant. For example, a typical specification for concrete for a construction project may require that the concrete be "fresh" or "plastic" for as long as about one-half hour to two hours after batching to arrive at the construction site in a plastic concrete condition. If the concrete in a given truck is not sufficiently fresh to meet specifications, the concrete must be disposed of in some fashion. In many cases, the truck will be simply driven back to the batching plant and the concrete poured onto the ground where it is allowed to set and then broken up and ultimately hauled away to a landfill or other disposal site. Alternatively, the concrete truck may dispatch its load of concrete at some other location since it is obviously critical that the concrete not be allowed to set up in the interior of the concrete truck.

Even where the concrete is in spec in terms of its age, the truck, after dispensing its load, will contain some residual concrete which, even though it may amount to only a few cubic feet, must be removed from the drum of the truck prior to reusing the truck. Typically, the concrete is removed from the truck by washing out the interior of the drum with water. The water, as it exits the drum, carries with it the residual concrete. This concrete may be discarded, or in some cases, the water concrete mix can be passed to a reclaiming system where aggregates and perhaps water are reclaimed for further use. Alternatively, the residual concrete can be simply poured out on the ground at a suitable location at the batching plant for ultimate disposal.

The concrete, once it is allowed to harden, can, as noted above, be broken up and then hauled away in trucks such as dump trucks, trailer trucks, and the like. The containers for these trucks are variously configured to deal with loose materials, such as gravel, stone, and the like. For example, U.S. Pat. No. 5,460,431 to McWilliams discloses a dump truck which can be used to unload particulate loose materials including materials such as wet sand and clays or the like which tend to become clogged in the trailer or that may have a tendency to become stuck and thus difficult to dump from the trailer at the disposal location. In the McWilliams patent the container for the dumping material is characterized as being "double-tapered" to facilitate dislodgement of the contents from the trailer. The double taper is provided by a tapered bottom floor that is wider at the back than at the front of the dump truck and also tapered upwardly in the side wall configuration so that the side walls slope upwardly and outwardly and are taller near the front end of the container than at the rear end. The cross-sectional area of the trailer defines a equilateral trapezoid which has a vertical height somewhat greater than the transverse dimension of the bottom floor section and with the side walls flared upwardly at an obtuse angle of about 111° to 112° to provide a substantially larger horizontal upper dimension. Another dump truck body, which is configured with a rearwardly-flared container and with the side walls curved upwardly and outwardly, is disclosed in U.S. Pat. No. 1,989,125 to Atwell. The side walls of the truck are curved to provide a very rigid configuration. Yet, other truck bodies which are rearwardly tapered or otherwise configured to facilitate the removal of materials, such as gravel, clay, or wet earth, by dumping are disclosed in U.S. Pat. No. 1,627,336 to Nelson and U.S. Pat. No. 5,090,773 to Guillaume.

SUMMARY OF THE INVENTION

In accordance with the present invention, there is provided a waste container of the type to be employed with a transfer system for the disposition of waste concrete. The container comprises a bottom floor section having a major dimension extending longitudinally of the container and front and rear lateral dimensions which are substantially less than the major longitudinal dimension. The container is closed at its forward end by a forward transverse wall section. The container further comprises opposed side walls extending longitudinally of the container and upwardly from the bottom floor section to define with the bottom floor section a receptacle for waste concrete. The longitudinal side walls are flared from the front to the back of the container to provide a back opening which has a lateral dimension greater than the lateral dimension of the forward transverse wall section.

The side walls are sufficiently flexible to permit relative displacement between a first lateral dimension corresponding to the configuration of the side walls when they are not stressed and a second lateral dimension which is less than the first lateral dimension. The container configuration further comprises a reconfiguration system connected to at least one of the side walls. The reconfiguration system is effective to compress the lateral dimension of the side walls relative to one another from the first somewhat greater lateral dimension to the second reduced lateral dimension when a plastic mass, such as unset concrete or the like, is added to the container. Preferably, the reconfiguration system comprises an adjustable tension member connected at its end to the side walls at a location intermediate of the forward and back portions of the container. The bottom floor section of the container is substantially monoplanar to provide a flat surface upon which the waste plastic concrete can spread or be spread as it is poured into the container. Preferably, a major vertical dimension of the side wall section is substantially monoplanar and is oriented relative to the bottom floor section in an approximately perpendicular relationship.

In a further aspect of the invention, there is provided a method for the disposition of waste concrete employing a longitudinally-extending container having a bottom floor section and longitudinal side walls extending upwardly from the bottom floor section which are flared from the front to the back of the container. The side walls of the container are drawn toward one another before or concomitantly with the addition of a mass of plastic concrete to the interior of the container. By compressing the side walls inwardly toward one another, the plastic concrete is allowed to set with the side walls in the compressed inward relationship. After the concrete has at least partially hardened to become self-supporting, the side walls are removed from the compressed relationship to an extended relationship in which the side walls move outwardly from one another to provide a clearance space between the hardened mass of concrete and the side walls. The hardened mass of concrete is then withdrawn from the container through the back portion thereof.

In yet a further embodiment of the invention, there is provided a method for the distribution of waste concrete at a terminal station, such as a concrete batching plant, from which concrete trucks are dispatched and returned. A transfer system, including an elongated container with a bottom floor section and flared side walls, is located at the terminal station. The side walls of the container are compressed inwardly toward one another at an intermediate location between the front and rear of the container, and a mass of plastic concrete from a concrete truck arriving at the terminal station is dispensed from the truck into the container. The concrete so dispensed may constitute a residual concrete content which may range from several cubic feet to as much as a cubic yard or more of concrete. This procedure is repeated a plurality of times with residual concrete removed from concrete trucks as they arrive at the terminal station. Once the container is filled to the desired capacity, it is then transported to a desired location for the disposition of waste concrete in the container. After the concrete has at least partially hardened to become self-supporting, the side walls are removed from the compressed relationship to the extended relationship to provide a desired clearance between the mass of concrete and the side walls. The hardened mass of concrete can then be withdrawn from the back portion of the container.

BRIEF DESCRIPTION OF THE DRAWINGS

FIG. 3 is a top view of a waste concrete container embodying the present invention.

FIG. 4 is a side elevation of the container of FIG. 3.

DETAILED DESCRIPTION OF THE INVENTION

Figure 1:
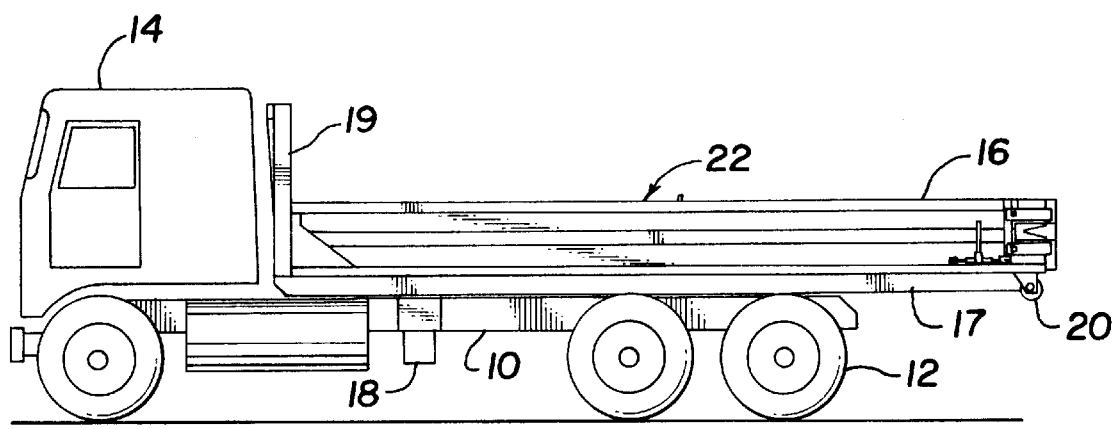
FIG. 1 is a side elevation of a dump truck adapted for disposal of waste concrete in accordance with the present invention.

As noted previously, it is a conventional practice to configure the container beds of dump trucks and the like in a manner to facilitate removal of loose materials from their interior. The present invention proceeds in a manner contrary to the conventional prior art practice by providing a container for a dump truck, such as a "roll-off" truck or the like, which is configured to facilitate the disposal of concrete as a large solid mass. Thus, rather than disposing of the plastic concrete by pouring it on the ground and then breaking it into particulate form, the concrete is poured into a transferable container and allowed to set in a unitary mass which is transported to a suitable disposal site. The container is configured to provide a long bed which is relatively flat in cross section to facilitate transfer of the concrete in a mass having a relatively low center of gravity. In addition, the concrete will harden in a cross-sectional configuration which facilitates hardening throughout the mass of concrete so that it can be ultimately removed from the container body as a large mass or broken up in perhaps two or three large chunks of concrete.

As noted previously, it is often necessary to dispose of concrete which is contained in the familiar concrete trucks with their rotating drums. One situation calling for concrete disposal is the somewhat unusual situation of a concrete truck containing concrete which has been allowed to age so that it is not within specifications and cannot be used in construction projects for which it was initially intended. Another more common situation is in the cleaning of concrete trucks as they return from an assigned trip containing residual amounts of concrete. Typically, the rotating drum upon arriving at a batching plant or some other terminal location will be cleaned out by running water through the truck as the drum is rotated and flushing the residual concrete from the truck. The truck can then be refilled with a fresh batch of concrete.

Several practices are followed in flushing concrete trucks to remove residual concrete. In some cases, the concrete is simply dumped on the ground and either left at the cleaning location or the concrete ultimately broken and hauled away to a landfill or other waste disposal site. In some instances, steps are taken to flush the concrete, now containing substantial amounts of water, into a recovery system from which aggregates and water can be recovered and reused in batching plant operations.

The present invention proceeds in a manner contrary to the normal prior art practice and provides for the use of a transferable container, e.g. on a roll-off truckbed, as described previously, which can be used as a depository for the concrete flushed from concrete trucks returning from an assigned trip. The container is configured in a manner so that residual concrete can be flushed from the returning trucks and dispensed from the truck drums into the interior of the container. Typically, as many as 20 or more trucks can be cleaned and flushed into the container before the container is full. During this time, the sides of the container are compressed laterally in a manner to provide an ultimate clearance between the hardened concrete and the container side walls so that when the roll-off truck or other system containing the container is sent to a disposal location, the hardened concrete can be easily removed from the container.

While the most common transfer system for the container containing the accumulated concrete will take the form of a vehicle, such as a roll-off truck or a trailer truck equipped with a dumping mechanism, the present invention can be carried out using other transfer systems, such as rail cars which can carry the container and be configured for disposal of concrete from the container. However, the invention will be described with reference to a roll-off truck modified to incorporate a waste concrete container configured in accordance with the present invention.

Turning now to FIG. 1, there is illustrated a side elevation of a roll-off truck comprising a truck chassis 10 having wheels 12 and equipped with a forward cab 14. The chassis 10 is equipped to support an elongated container 16, as described in greater detail later and a lifting mechanism 18, such as a hydraulic hoist incorporating a hydraulic piston mechanism coupled between the chassis and a bridle section 19 of the container 16. Lifting mechanism 18 may be of any suitable type. Such mechanisms, which can be employed in the present invention, are disclosed in U.S. Pat. Nos. 4,934,898 to Galbraith and 5,601,393 to Walschmidt, the entire disclosures of which are incorporated herein by reference. The container is mounted on a frame 17 which is adapted to pivot at the back end of the truck chassis 10 and is provided with rollers 20 at its back section so that when the container is elevated, the rollers will rest on the ground. The container 16 is also provided with a ratchet system 22, to be described in detail later which functions to compress the side walls of the container as the container is filled with plastic concrete.

Figure 2:
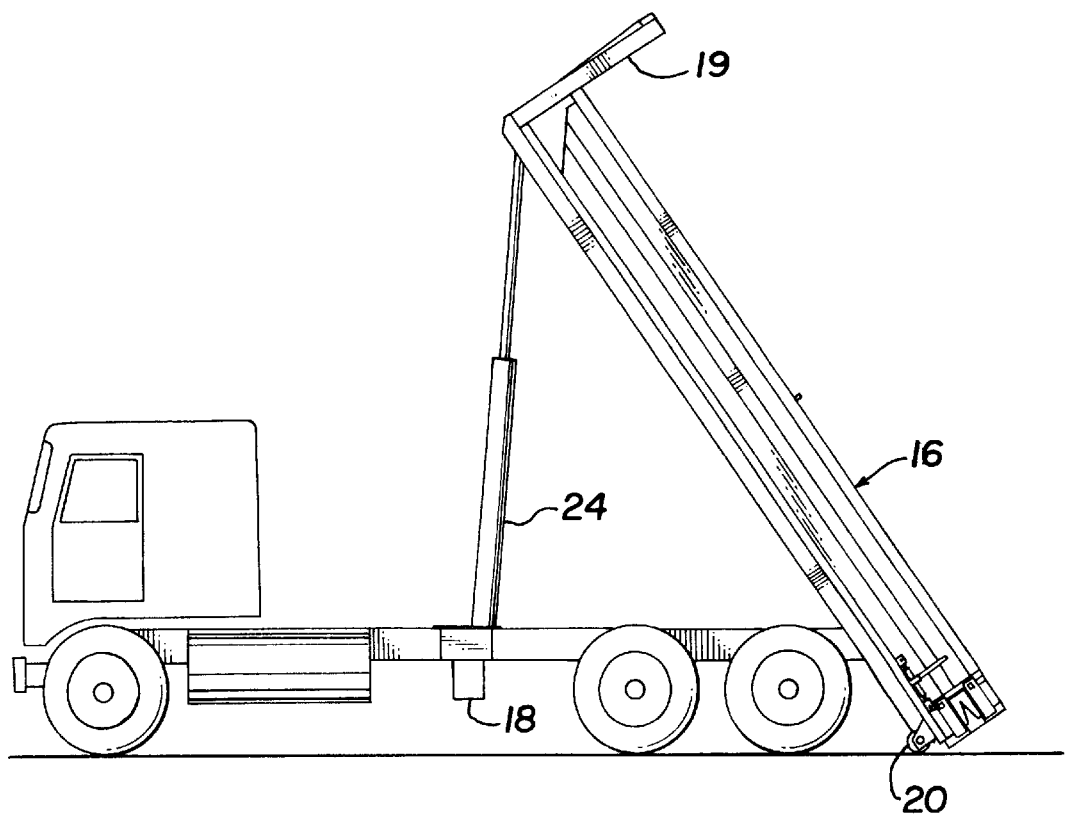
FIG. 2 is a side elevation of the truck of FIG. 1 showing the waste container configured for disposal of concrete from the truck.

The roll-off truck lifting mechanism is configured to tilt the front end of the container upwardly through a significant angle, preferably an angle of at least 45 degrees from the horizon, in order to facilitate removal of hardened concrete from the container in a manner described below. Thus, as illustrated in FIG. 2, the container 16 can be elevated through the lifting mechanism comprising a pair of hydraulic cylinders 24 (only one being shown in FIG. 2) which extend from the lifting mechanism base on the chassis up to the bridle section 19 of the container.

Turning now to FIG. 3, there is illustrated a plane view of the container 16. The container comprises an elongated, longitudinally-extending bottom floor section 24 and opposed side walls 26 and 27. The side walls extend from an upwardly sloping front transverse wall section 28 at the forward end of the container to the rear of the container which is closed by a removable rear gate 30. Rear gate 30 is connected to the container on the passenger side of the truck by a hinged connection 32. The side walls 26 and 27 are flared outwardly slightly from the front to the back of the container to facilitate removal of a concrete mass from the container in a manner to be described later. In an embodiment of the invention constructed to carry approximately 10 cubic yards of concrete, the length of the container, indicated by dimension d3 in FIG. 3, is approximately 23 feet long. The side walls are flared from front to back from a front internal width, indicated by dimension d1, of 83½ inches and a rear internal width, indicated by dimension d2, of 86¾ inches. This provides a composite angle of flare of the side wall sections of about 0.9°. By the term composite angle of flare, as used herein, is meant the sum of deviation of the two side walls from the perpendicular, as indicated by a right angle formed between the longitudinal dimension of the container and the transverse dimension of the container. Thus, in the embodiment illustrated in FIG. 3, each of the side walls 26 and 27 is flared outwardly by an angle of about 0.45° corresponding to an obtuse angle made by the side wall and front wall section of 90.45°, as indicated by angle a1 in FIG. 3. While it is preferred that both side walls be flared outwardly, it is to be recognized that the composite angle of flare can be provided with one side wall forming a 90° angle with the front wall and the other side wall being flared outwardly at about 0.90° (corresponding to an obtuse angle of 90.9°, again producing a composite angle of flare of 0.9°.

The composite angle of flare for the container is significant. An angle which is too small will provide insufficient clearance between the side walls and the hardened mass of concrete, thus making removal of the concrete under the influence of gravity difficult. However, if the angle is too great, the set concrete block will tend to shift in some instances under the influence of gravity, thus becoming more or less wedged within the container so that it could not be readily discharged by gravity. Preferably, in carrying out the invention, the composite angle of flare for the side walls in within the range of 0.8–1.2° and, more particularly, within the range of 0.9–1.1°. In experimental work carried out with respect to the invention, a composite angle of flare of about 1.5° (each of the side walls flared at an angle of 0.75°) was shown to allow some shifting, which was deleterious to removal of the concrete block under the influence of gravity. As indicated previously, a composite angle of flare of 0.9° has been found to work satisfactorily for a container adapted to contain about 10–11 cubic yards of concrete.

An important feature of the present invention is the use of side walls which are sufficiently flexible to permit compression through the use of a suitable reconfiguration system so that they can be compressed during the time the plastic concrete is loaded into the truck and allowed to set. Suitable side walls for the embodiment illustrated in FIG. 3 can take the form of 3/16-inch thick steel having two tubular side channels, an upper side channel 34, and an intermediate side channel 36 (not shown in FIG. 3) to provide sufficient longitudinal strength to prevent buckling by the hydrostatic head imposed by a plastic mass of concrete within the truck.

Another important feature of the invention is a reconfiguration system adapted to compress the lateral distance between the walls at an intermediate location of the container. In the embodiment illustrated in FIG. 3, the reconfiguration system comprises a tension bar 40 equipped with a ratchet mechanism 42. The tension bar 40 is connected to upstanding lugs 44 and 45 which extend upwardly from the side walls 26 and 27. The ratchet section includes a handle 43 which can be moved from the horizontal position shown in FIG. 3 to a vertical position and actuated to draw the two side walls inwardly so that they are compressed by about ½ to 1½ inches to a reduced lateral dimension at the intermediate section of the container. Stated otherwise, the side walls are retracted inwardly by about ½ to 2% of the width of the container.

FIG. 4 is a side elevational view (from the driver's side of the truck) of the container shown in FIG. 3. In FIG. 4, the ratchet handle 43 is oriented to the vertical position for actuation to compress the side walls toward one another. As noted previously, the rear gate 30 is hinged to the side wall 26 on the passenger side of the truck. The driver's side of the truck is provided with a latching mechanism 48 which can be used to secure the tailgate in the closed position. The tailgate includes forwardly extending arms 30a and 30b which are secured to the suitable locking lugs on the side wall when the tailgate is the closed position. In the open position, the tailgate can be rotated through an angle of about 270° so that it lies flush with the side wall 26.

Figure 5:
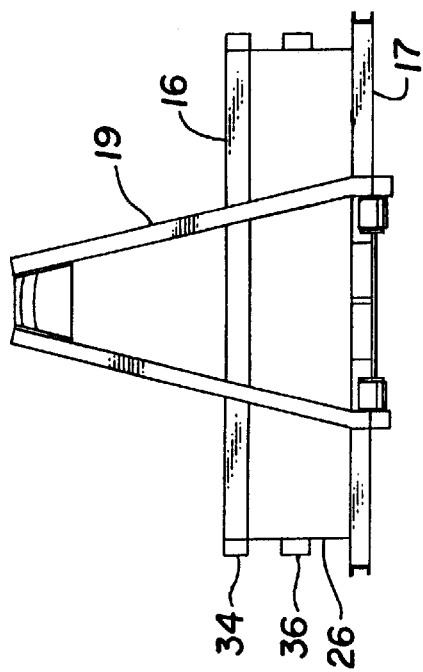
FIG. 5 is a front view of the container of FIG. 3.
Figure 6:
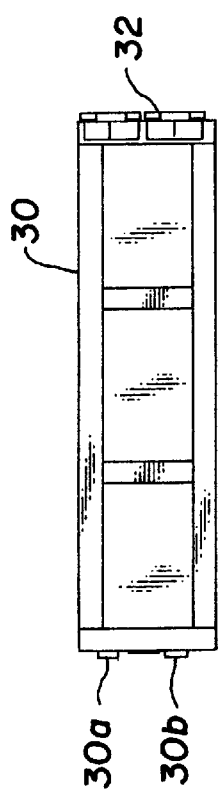
FIG. 6 is a side elevation of a tailgate for the container of FIG. 3.

Additional details of the container are illustrated in FIGS. 5 and 6 which show front and rear elevational views of the container of FIG. 3. FIG. 5 shows the structure of the front bridle section which extends forwardly and upwardly from the bottom frame 17 which supports the floor of the container. The bridle section is adapted to receive the lifting means, such as the hydraulic pistons shown in FIG. 2. The rear gate, as illustrated in FIG. 6, includes hinges 32 on the right side connected to the wall section and on the left side the forwardly-extending lugs 30a and 30b shown also in FIG. 4.

Figure 7:
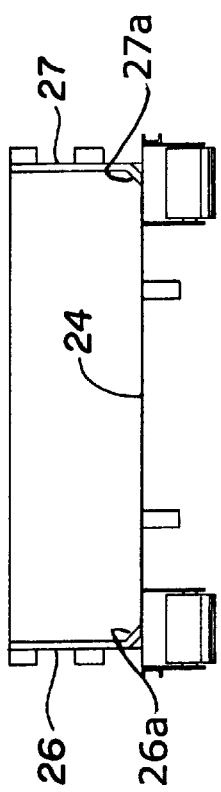
FIG. 7 is a schematic cross-sectional view of the container of FIG. 3 showing the desired relative dimensions of the floor and side walls of the container.

FIG. 7 is a schematic cross-sectional view of the container shown in FIG. 3 illustrating the important dimensional configurations of the container. Although, as described later, the side walls can be flared outwardly from top to bottom as viewed in cross section, preferably they are substantially vertical, with the exception of miter joints 26a and 27a indicated in FIG. 7. The miter joints are provided at the intersection of the wall sections with the floor section. As indicated in FIG. 7, the bottom floor is substantially monoplanar to provide a flat surface upon which to support the hardened concrete. In addition, the cross-sectional configuration of the container is a rectangle of a relatively small vertical dimension, which at the most is no more than the average lateral dimension and preferably is much smaller. Specifically, the average height of the side wall section is no more than one-third of the average lateral dimension of the bottom floor and preferably within the range of 0.2 to 0.3 of the average lateral dimension of the flat bottom floor section. Also, as shown, for example, in FIG. 7, the side wall sections are monoplanar and intersect the bottom wall section in a substantially perpendicular relationship. While a slight outward flare can be accommodated, this should not exceed more than a few degrees. The angle between the bottom section and the side walls should be either perpendicular, i.e. 90°, or only slightly obtuse, that is, an obtuse angle up to about 95°. It is highly desirable that a substantial upward flare be avoided in order that the operation of the compression system effect a substantial vertical portion of the side walls.

The relatively shallow bed of the container employed in the present invention is particularly advantageous in the application of the invention in which the container system is used as a depository for residual concrete cleaned out of trucks returning from runs from a batching plant. The repeated dispensing of residual concrete from a plurality of trucks results in the waste concrete being added to the container in lifts which typically may range from a fraction of an inch to several inches in thickness. The lifts may be deposited at close intervals, or they may be deposited at intervals of several hours between the cleaning of one truck and the cleaning of the next truck, depending upon the schedule of deliveries. In either case, the side walls can be maintained in the compressed configuration by the ratchet system until the container is filled to capacity. The waste concrete truck is then dispensed to a suitable disposal site while retaining the side walls in the compressed configuration as necessary while the concrete continues to harden in transit. After the concrete in the container has hardened and has become self-supporting, whether at the batching plant, in transit, or after reaching the disposal site, the ratchet system can then be released to allow the side walls to return to their original configuration. The front end of the container is then elevated, preferably through an angle of at least 45°, after opening of the tailgate 30. After the container has reached the elevated position, as shown in FIG. 2, the truck is driven forward slightly to allow the concrete to be dispensed under the influence of gravity, usually in several large chunks. That is, the concrete mass may split laterally at one or two, or perhaps three, locations along the longitudinal length of the hardened mass of waste concrete.

As can be recognized from the foregoing description, the relatively shallow rectangular configuration of the container is advantageous in several respects. It provides a relatively low center of gravity enabling the waste concrete to be transported easily and safely. The plastic concrete, as it is poured into the container in several discreet lifts, ranging perhaps ½-inch to several inches in thickness will tend to harden in a cohesive mass which can be removed from the waste concrete track with relative ease.

Figure 8:
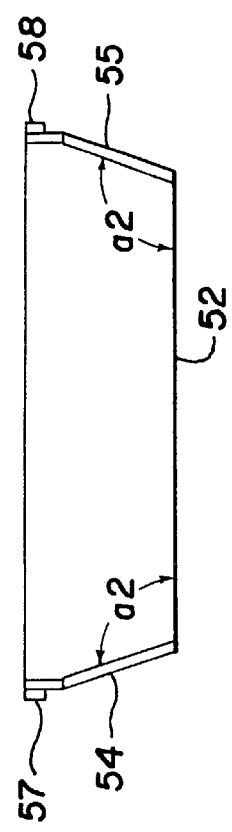
FIG. 8 is a schematic cross-sectional view illustrating a different embodiment than the embodiment of FIG. 7.

While the preferred cross-sectional configuration of the waste concrete container embodying the present invention is rectangular as shown in FIG. 7, it is also possible to provide a container having a configuration in which the side walls taper upwardly and outwardly to provide a trapezoidal configuration. This is illustrated in FIG. 8, which is a schematic cross-sectional view of a container 50 having a flat bottom portion 52 and opposed side walls 54 and 55 which extend upwardly to an upper rim having longitudinally-extending support beams 57and 58. In this embodiment of the invention, the vertical dimension of the container should be relatively shallow as before, typically providing a ratio of the width of the floor to the height of the trapezoid of about 4:1. Where the sides are flared outwardly, they should, nevertheless, remain substantially close to the vertical and should form an obtuse angle with the floor section, as indicated by angle a2 of FIG. 8 of no more than about 115° and preferably no more than 95° as indicated previously. A container of this configuration can be operated to compress its side walls to expedite the formation of a clearance space once the concrete mass has hardened. However, the concrete mass is not dislodged from the container as effectively as it is in the preferred embodiment, as characterized by the rectangular cross section of FIG. 7.

Although not necessary, it will usually be desirable to coat the interior surfaces of the container, particularly the floor section and the side walls with an oliophilic release agent in order to avoid a tight bond between the concrete as it sets up and the surrounding container surfaces. A suitable release agent for use in this regard is a petroleum fraction, such as diesel oil, or synthetic commercial release agents including minerals oils and vegetable oils.

Having described specific embodiments of the invention, it will be understood that modifications thereof may be suggested to those skilled in the art, and it is intended to cover all such modifications as fall within the scope of the appended claims.

What is claimed:

1. In a container configuration adapted to be employed with a transfer system for the disposition of concrete, the combination comprising:
   (a) a longitudinally-extending bottom floor section having a major dimension extending longitudinally of said container having front and rear lateral dimensions which are substantially less than said major longitudinal dimension;
   (b) a forward transverse wall section at the forward end of said container, opposed side walls extending longitudinally of said container and extending upwardly from said bottom floor section to define with said bottom floor section a receptacle for waste concrete, said longitudinal side walls being flared from the front to the back of said container to provide an opening at the back of said container which has a lateral dimension greater than the lateral dimension of said forward transverse wall section;
   (c) said side walls being sufficiently flexible to permit relative displacement there between a first lateral dimension and a second lateral dimension which is less than said first lateral dimension; and
   (d) a reconfiguration system connected to at least one of said side walls and effective to compress the lateral dimension of said side walls from said first lateral dimension to said second reduced lateral dimension when a plastic mass is added to said container.

2. The combination of claim 1 wherein said side walls-extend upwardly from said bottom floor section in an approximately perpendicular relationship.

3. The combination of claim 1 wherein said reconfiguration system comprises an adjustable tension member connected at one end to one of said side walls and at the other end to the other of said side walls at a location intermediate of the fore and aft portions of said container.

4. The combination of claim 3 further comprising a system for adjusting the lateral dimension of said tension member to permit said tension member to be reduced to compress the side walls of said container inwardly toward one another.

5. The combination of claim 1 wherein said longitudinal side walls are flared from the front to the back of said container at a composite angle of flare within the range of 0.8–1.2°.

6. The combination of claim 5 wherein said composite angle of flare of said walls is within the range of 0.9–1.1°.

7. The combination of claim 6 wherein said composite angle of flare of said side walls is about 0.9°.

8. The combination of claim 1 wherein said side walls have an average height which is no more than one-half of the average lateral dimension of said floor section.

9. The combination of claim 8 wherein the average height of said side walls is no more than one-third the average lateral dimension of said bottom floor section.

10. The combination of claim 9 wherein the average height of said side walls are within the range of 0.2–0.3 of the average lateral dimension of said floor section.

11. The combination of claim 9 wherein said bottom floor section is substantially monoplanar.

12. The combination of claim 11 wherein said side walls are substantially monoplanar throughout a major vertical dimension hereof and are oriented relative to said bottom floor section in an approximately perpendicular relationship.

13. The combination of claim 1 wherein said container is mounted on a vehicle having a dumping system operable to displace the front end of said container upwardly to a location which said bottom floor section defines an angle of at least 45° with the surface supporting said vehicle.

14. The combination of claim 1 wherein said bottom floor section is substantially monoplanar and the average height of said side walls is no more than one-third the average lateral dimension of said bottom floor section.

15. The combination of claim 1 wherein said reconfiguration system comprises an adjustable tension member connected at one end to one of said side walls and at the other end to the other of said side walls at a location intermediate of the fore and aft portions of said container, said reconfiguration system incorporating a ratchet mechanism to reduce the tension member to draw the side walls of said container inwardly toward one another.

\* \* \* \* \*